Dec. 4, 1928.
H. STEINRÜCK
1,693,768
SCREW THREAD TAP
Filed April 16, 1923
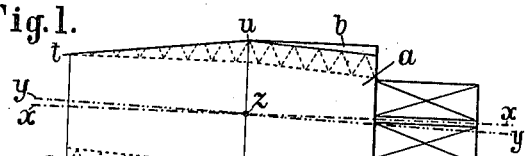
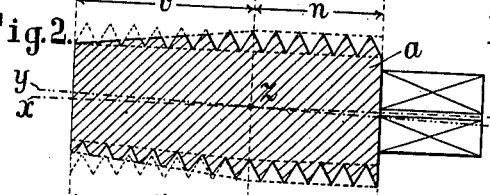
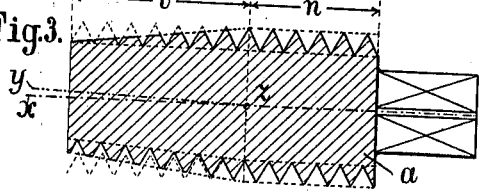
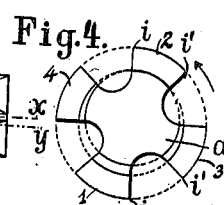
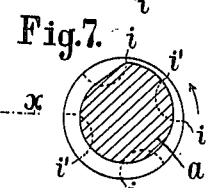
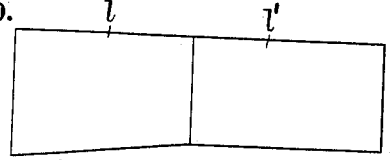
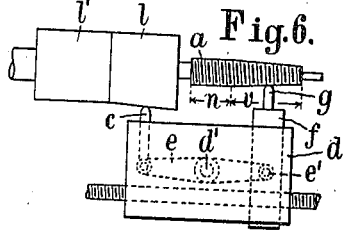
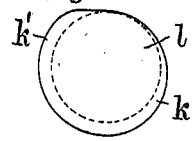
Inventor:
Hermann Steinrück
By: Herbert G. R.
Attorney.

Patented Dec. 4, 1928.

1,693,768

UNITED STATES PATENT OFFICE.

HERMANN STEINRÜCK, OF BERLIN, GERMANY.

SCREW-THREAD TAP.

Application filed April 16, 1923, Serial No. 632,481, and in Germany April 24, 1922.

The known screw-thread taps consist of a cylindrical body or core which is provided with the threads to be cut into a bore or bores. There are, however, complete threads only at the rear end of the threaded part of the tap, whereas the other threads are more and more incomplete in the direction to the front end of the tap, concerning their circumference as well as their depth. The chips produced while cutting the threads into a bore are removed radially. Owing thereto, the chips are of trapezoidal shape which tends strongly to produce rents at the flanks of the threads in consequence of which the chip thickness must be reduced as much as possible in order to produce an accurate thread. With comparatively large taps also the friction arising in the bore during the cutting of the threads is very great. To obtain as flat chips as possible the tap must have as many teeth as possible which, however, makes it very long. It is, therefore, customary in practical tapping, to divide the long tap into three shorter ones, which are known, for instance, under such terms as rough tap, intermediate tap and finishing tap.

It has already been tried to combine the three cutting procedures into one, that is to say, to effect the cutting with but one, comparatively short tap, and to obviate at the same time the production of trapezoidal chips, for which purpose the thread-cutting teeth were provided on a cylindrical body or core but were of decreasing height and breadth in the direction from the rear end to the front end of the tap. A tap of this kind produces in the bore wall a spirally shaped path or groove which is enlarged and deepened by the consecutive teeth. There then result during the cutting flat chips which easily roll up helically and do not, therefore, produce rents. The manufacture of such taps is, however, very expensive as every tooth must be worked separately.

The present invention relates to a screw-thread tap, which is also intended for taking the chips off in parts, but this tap is considerably simplified in comparison to the known ones. According to this invention the body or core of the roughening part of the tap is so positioned relatively to an axis of the finishing part again mentioned hereinafter, that its axis forms an angle with said other one. The eccentricity may, however, be provided for in various ways. Thus, for instance, the conical body defined by the base of the threads of the roughening part may be co-axial with the bore to be tapped, but the axis of the cutting edges, or thread parts, of this part may lie at an angle with respect to the axis of said body or core part of the tap, the work piece having the bore being then clamped correspondingly eccentrically with respect to the conical body. This latter acts then at the opposite sides of its roughening part which lies eccentrically with respect to the centering line, and produces a conical core portion, the axis of which is as much inclined with respect to the bore axis as corresponds to the eccentric adjustment. Anyhow, instead of arranging the work piece eccentrically in order to cut the threads thereinto, the chaser might move to and fro, during every revolution of the work piece whereby also a conical core positioned eccentrically as required for the purpose in view would be produced.

My invention is illustrated, by way of example in the accompanying drawing, in which Figure 1 is a side view of the tap blank, prepared for having cut the threads thereinto, the dotted lines indicating one form of the finished tap. Figure 2 is an axial section through a finished tap, the turning tool being assumed to be disposed at right angles with respect to the axis $y$—$y$. Figure 3 is an axial section through a finished tap of modified construction, similar to that shown in Fig. 2, but the turning tool being assumed to be disposed at right angles to that shown in Fig. 2. Figure 4 is a left-hand end view of the tap shown in Fig. 2. Figure 5 is a side view of a templet used in the manufacture of a tap of the kind shown in Figure 3. Figure 6 illustrates, on a greatly reduced scale, the application of this templet, when cutting the thread on the tap, the figure showing also some mechanism used for producing the thread. Figure 7 is a transverse section through the roughening cone of a tap in which the eccentric core shown in Figure 4 has been corrected so that the cutting teeth along their entire length retain at least the same tooth height as at the cutting edge. Figure 8 is a cross section similar to Figure 7, of a tap in which the teeth are arranged upon a spiral.

The tap blank $a$, Figure 1, is first transformed partly into a cone $v$, the length of which corresponds to the length of the roughening part the tap is to have. $x$—$x$ is the axis of this truncated cone. The diameter of the truncated cone in the transversal plane $u$—$u$ is equal to the outer diameter of the threads, and the diameter at the frontal surface, viz., in the plane $t$—$t$, is equal to the diameter of the bore to be tapped. The frontal surface at $t$—$t$ lies concentrically with respect to the axis $x$—$x$.

The tap blank having been worked thus far receives now another position between the centering points, viz, in the line or axis $y$—$y$ which forms an acute angle with the axis $x$—$x$. The two axes intersect one another at the point $z$ which is located in the plane $u$—$u$. The thread is now being cut upon the truncated cone $v$ about the axis $y$—$y$, as indicated by the dotted lines in Figure 1 and as shown in Figures 2 and 3 in full lines. There are produced in this way high teeth and low teeth 1 and 2, Figure 4.

When cutting the thread upon the part $v$ of the tap in the direction of the axis $y$—$y$ the high teeth are arranged in such a manner in the thread channel that they have a greater distance from the one flank of the thread channel than from the other, for they are cut with a tool positioned at a right angle to the axis $y$—$y$, and are therefore slanting to the axis $x$—$x$, as shown in Figure 2. In the drawing, Figure 2, part $v$, lower half, the left flank of the tap teeth lies nearer to the neighbouring flank of the channel teeth shown in dotted lines, than the corresponding flanks on the right side of each tooth. The teeth are therefore unsymmetrical in this case. To get a symmetrical thread on the tap part $v$ the cutting may be effected in the manner illustrated in Figure 3 with the aid of the templet and the mechanism shown in Figures 5 and 6. The blank piece is clamped into a lathe together with a templet 1, 1', Figure 5, which is profiled longitudinally, as well as transversely. The front part 1 of the templet corresponds to the tap part $v$ and is somewhat conical at one of its sides, whereas its other part 1' is cylindrical. The position of the templet as shown in Figure 5 corresponds to Figure 3, but in Figure 6, where the templet is shown on a considerably reduced scale, it is reversed. The templet contacts with a pin copying $c$ which is guided in the longitudinal tool rest $d$ and is hinged to a double-armed lever $e$ pivoted in this rest at $d'$. The other arm of the lever $e$ is movably connected at $e'$ with a transverse slide $f$ to which the chaser $g$ is clamped. When the templet is rotated simultaneously with the work piece, the chaser is moved forward and backward at every rotation of the templet upon the pin $c$, the lever $e$, and the slide $f$ and it cuts, therefore, to different depths in the work piece on opposite sides thereof, whereby symmetric teeth of different height are produced. There is obtained in this way a thread core with the axis $y$—$y$, whereas the circumference of the tap has the axis $x$—$x$ which corresponds with the bore hole axis.

The cutting or milling of the teeth may be continued so as to provide at the same time also the length $n$, which corresponds to the after cutting part of the tap with threads. If this thread cutting is performed with the axis on line $y$—$y$ first the part $n$ must be milled to be a truncated cone. Therefore the hatched part $b$, showing the eccentric portion around part $n$ will be removed. The finished thread is indicated by the dotted lines in Figure 1.

If the tap part $n$ shall receive thread-cutting teeth which are of equal size and shape around the circumference of the tap, the thread is cut into it about the axis $x$—$x$, as shown in Figure 2 on part $n$. But on part $v$ the thread is cut about the axis $y$—$y$, so that the single tooth stands at right angles to this axis.

In the manufacture of taps having a circular eccentric core cross section as shown in Figure 4, the height of two teeth 2 and 3 out of every four in each convolution of the thread will increase continuously from the cutting edge $i$ over the whole length of the teeth counter to the direction of the arrow, while the height of the other two teeth 1 and 4 will decrease continuously from the cutting edge $i$ over their entire length. Therefore, the two first-mentioned teeth are backed off at the flanks so that the cross section of the teeth 2 and 3 may decrease beginning from the cutting edge $i$ rearwardly, while the other two teeth 1 and 4 will decrease in cross section beginning from their cutting edge $i$ to the trailing edge $i'$. In order to have all the teeth of the tap with at least the same height the circumference of the core may be corrected as shown in Figure 7. In order to attain this immediately when manufacturing the tap, the templet 1 is correspondingly shaped. The sectional shape thereby obtained in the tap part $v$ is illustrated in Figures 7 or 8 which show that the height of all teeth along their whole length is at least that as at the cutting edges $i$.

Claims:

1. A screw tap having a thread core comprising a finishing part preceded by a roughening part, the axis of which latter part deviating from the main axis of the tap, and cutting teeth provided on said thread core.

2. A screw tap having a thread core comprising a roughening part and a finishing part, the axis of one of said parts deviating from the main axis of the tap and cutting teeth provided on said thread core.

3. A screw tap having a thread core comprising a finishing part preceded by a roughening part, the axis of which latter part deviates from the main axis of the tap, a cross-section of said thread core taken at a right angle to said main axis being non-circular, and cutting teeth provided on said thread core.

In testimony whereof I affix my signature.

HERMANN STEINRÜCK.